(12) United States Patent  
Papa et al.

(10) Patent No.: US 8,956,150 B2
(45) Date of Patent: Feb. 17, 2015

(54) MOLDING APPARATUS

(75) Inventors: Renato Papa, Scarborough (CA); Derek Robertson McCready, Mississauga (CA); Maxfield Paul Bradshaw, Oakville (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 109 days.

(21) Appl. No.: 13/813,340

(22) PCT Filed: Aug. 11, 2011

(86) PCT No.: PCT/CA2011/050489
§ 371 (c)(1),
(2), (4) Date: Jan. 30, 2013

(87) PCT Pub. No.: WO2012/019304
PCT Pub. Date: Feb. 16, 2012

(65) Prior Publication Data
US 2013/0142902 A1 Jun. 6, 2013

Related U.S. Application Data

(60) Provisional application No. 61/372,891, filed on Aug. 12, 2010.

(51) Int. Cl.
B29C 45/34 (2006.01)
B29C 45/17 (2006.01)
(Continued)

(52) U.S. Cl.
CPC .......... *B29C 45/1775* (2013.01); *B29C 33/005* (2013.01); *B29C 45/33* (2013.01); *B29C 45/34* (2013.01); *B29K 2105/253* (2013.01)

USPC ........................................................ 425/577

(58) Field of Classification Search
CPC ...... B29C 33/005; B29C 33/46; B29C 45/33; B29C 45/34
USPC ........................................................ 425/577
See application file for complete search history.

(56) References Cited

U.S. PATENT DOCUMENTS 5,736,173 A 4/1998 Wright et al.
7,234,930 B2 6/2007 Niewels et al.
(Continued)

FOREIGN PATENT DOCUMENTS

EP 2343176 A1 7/2011
KR 100815792 B1 3/2008
(Continued)

OTHER PUBLICATIONS

European Search Report, Apr. 25, 2014, 6 pages.
(Continued)

*Primary Examiner* — Alison Hindenlang

(57) ABSTRACT

Disclosed herein is, amongst other things, a molding apparatus that includes a core ring (140, 340, 440, 540, 640, 740) that is configured to seat, in use, around a core insert (120, 320, 420, 620) in a mold stack (116, 216, 316, 416, 516, 616, 716). The core ring (140, 340, 440, 540, 640, 740) is configured to be received, at least in part, within a pocket (152) that is defined within a split insert (150) of the mold stack (116, 216, 316, 416, 516, 616, 716). The core ring (140, 340, 440, 540, 640, 740) is also configured to define at least a portion of a molding cavity (119) having a core ring-to-split insert parting line (180) that is within the pocket (152) of the split insert (150).

10 Claims, 7 Drawing Sheets

(51) Int. Cl.
   *B29C 45/33* (2006.01)
   *B29C 33/00* (2006.01)
   *B29K 105/00* (2006.01)

(56) References Cited

U.S. PATENT DOCUMENTS

| | | |
|---|---|---|
| 7,762,802 B2 | 7/2010 | Mai |
| 2009/0061043 A1 | 3/2009 | Fisch et al. |
| 2009/0068307 A1 | 3/2009 | McCready |

FOREIGN PATENT DOCUMENTS

| | | |
|---|---|---|
| WO | 2010017622 A1 | 2/2010 |
| WO | WO 2011007099 A1 * | 1/2011 |

OTHER PUBLICATIONS

PCT International Search Report, Pengfei Zhang, Oct. 4, 2011, 3 pages.

* cited by examiner

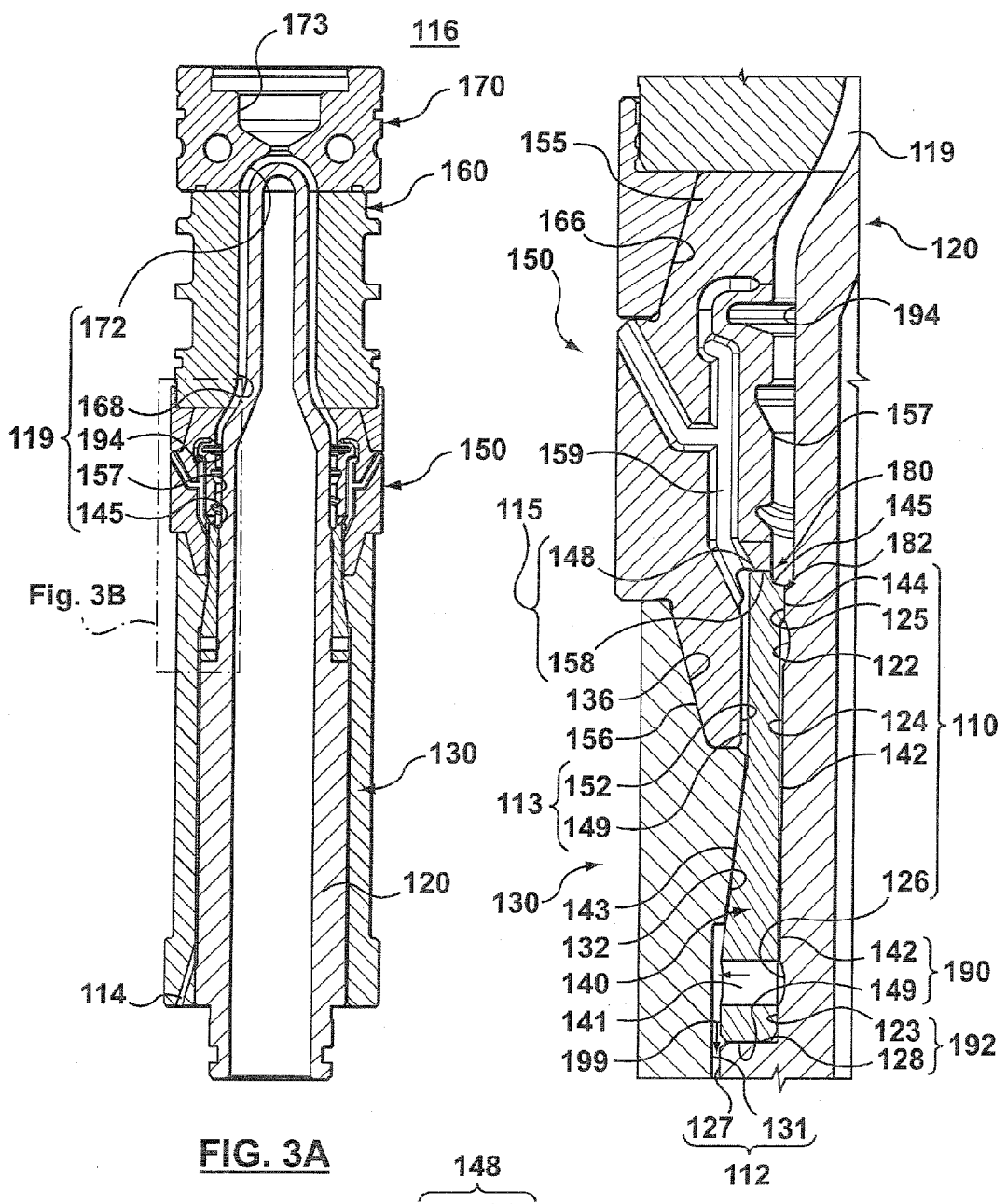
FIG. 3A
FIG. 3B
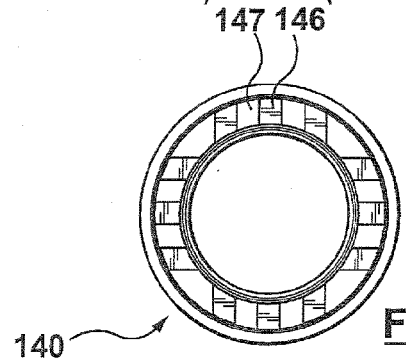
FIG. 3C

MOLDING APPARATUS

TECHNICAL FIELD

The non-limiting embodiments disclosed herein generally relate to a molding apparatus, and more particularly to components of a mold stack for use in an injection mold.

BACKGROUND

Molding is a process by virtue of which a molded article can be formed from molding material (such as Polyethylene Teraphalate (PET), Polypropylene (PP) and the like) by using a molding system. Various molded articles can be formed by using the molding process, such as an injection molding process. One example of a molded article that can be formed, for example, from PET material is a preform that is capable of being subsequently blown into a beverage container, such as, a bottle and the like.

As an illustration, injection molding of PET material typically involves heating the PET material to a homogeneous molten state and injecting, under pressure, the so-melted PET material is injected into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be de-molded, i.e. ejected off of the core piece. Ejection structures are known to assist in removing the molded articles from the core halves. Examples of the ejection structures include stripper plates, stripper rings and neck rings, ejector pins, etc.

When dealing with molding a preform that is capable of being blown into a beverage container, one consideration that needs to be addressed is forming a so-called "neck region". Typically and as an example, the neck region includes (i) threads (or other suitable structure) for accepting and retaining a closure assembly (ex. a bottle cap), and (ii) an anti-pilferage assembly to cooperate, for example, with the closure assembly to indicate whether the end product (i.e. the beverage container that has been filled with a beverage and shipped to a store) has been tampered with in any way. The neck region may comprise other additional elements used for various purposes, for example, to cooperate with parts of the molding system (ex. a support ledge, etc.). As is appreciated in the art, the neck region can not be easily formed by using the cavity and core halves. Traditionally, split mold inserts (sometimes referred to by those skilled in the art as "neck rings") have been used to form the neck region.

With reference to FIG. 1, a section along a portion of an injection mold 10 illustrates a portion of typical mold stack 16 that is arranged within a molding system (not depicted). The description of FIG. 1 that will be presented herein below will be greatly simplified, as it is expected that one skilled in the art will appreciate configuration of other components of the injection mold 10.

The mold stack 16 includes a first stack portion 17 and a second stack portion 18 that are associated, in use, with a first mold half 14 and a second mold half 12 of the injection mold 10, respectively. The first stack portion 17 and the second stack portion 18 are arrangeable, in use, to define a molding cavity 19 therebetween within which molding material may be injected to form a molded article. The first stack portion 17 includes a core insert 20, a lock ring 30, and a neck ring pair 40. The core 20 and the neck ring pair 40 each include molding surfaces with which to define an inner body portion and an encapsulated portion (e.g. for molding the neck region on the preform/container) of the molding cavity 19, respectively. The lock ring 30 does not define any portion of the molding cavity 19, although this is not always so, and wherein the lock ring 30 is provided to both retain the core insert 20 to a core plate (not shown) and to align and hold closed (i.e. keep the halves thereof in a closed configuration) the neck ring pair 40 during a step of molding of the molded article. The second stack portion 18 includes a cavity insert 50 and a gate insert 60 with which to define an outer body portion and a gate portion of the molding cavity 19. The gate insert 60 is further configured to connect the molding cavity 19 to a melt distribution system (not shown). Lastly, and much like the lock ring 30, the cavity insert 50 is also configured to both align and hold closed the neck ring pair 40 during the step of molding.

Also shown are a slide pair 70 upon which the neck ring pair 40 are mounted. The slide pair 70 is slidably mounted on a top surface of a stripper assembly 72. As commonly known, and as generally described in U.S. Pat. No. 6,799,962 to Mai et al (granted on Oct. 5, 2004), the stripper assembly 72 is configured to be movable relative to a cavity plate assembly 74 and a core plate assembly (not depicted), when the mold in arranged in an open configuration, whereby the slide pair 70, and the complementary neck ring insert pair 40 mounted thereon, can be laterally driven, via a cam arrangement (not shown), for the release of the molded article from the molding cavity 19.

The neck ring 40 has a body that includes a first projecting portion 45 and a second projecting portion 46 that extend from a top and a bottom face of a flange portion 48. As shown, the first projecting portion 45 and the second projecting portion 46 may be structured in the form of male tapers.

In operation, with the mold stack 16 being closed, as shown, to define the molding cavity 19, the first projecting portion 45 and the second projecting portion 46 are arranged to cooperate with a first seat 52 and a second seat 32 that are defined in the cavity insert 50 and the lock ring 30 to both align and lock the neck ring pair 40 in relation thereto. As shown, the first seat 52 and the second seat 32 may be structured in the form of female tapers.

Also shown, is a parting line 26 between the molding surfaces of the core insert 20 and the neck ring 40 (i.e. the place where the molding surfaces of the neck ring pair 40 and core insert 20 meet) that is pushed up inside the neck ring pair 40. More particularly, the parting line 26 is located at an interface between top face of a protuberance 22 that is defined around a medial portion of the core insert 20 and a recessed face of a pocket 42 that is defined through the bottom face of the neck ring pair 40. Also note that an inner annular portion of the top face of the protuberance 22 defines molding surface with which to define a top end portion of the molding cavity 19 (e.g. for molding a top sealing surface of the neck region on the container). A technical effect of the foregoing may include flexibility of parting line location for sake of molding neck regions having shorter threads with lower risk of ejection related issues. Furthermore, by moving the parting line 26 to be in line with the flange 48 of the neck ring pair 40, which may be cooled by means (not shown) of a coolant circulating therethrough, certain cooling related defects (e.g. parting line indentation) may be avoided.

A description of a mold stack that is similar to the foregoing may be referenced in US Patent Application US2009/0214694 to Mai, published on Aug. 27, 2009, which discloses, amongst other things, a mold insert stack for use in an injection mold and a coupler thereof.

The mold insert stack for use in an injection mold is provided and comprises a core assembly that includes: a core insert that includes: a core body; an inner molding surface that is defined on the core body, the inner molding surface provides, in use, an inner portion of a molding cavity that is shaped to mold a preform; a core-coupler interface that is defined on the core body; a support member that includes: a support body; a support-sliding interface that is defined on the support body; a coupler member that includes: a coupler body; a coupler-core interface that is defined on the coupler body; a coupler-insert interface that is defined on the coupler body; and a complementary sliding interface that is defined on at least one of the coupler body and the core body; the coupler-core interface and the core-coupler interface being configured to cooperate, in use, to mutually locate the coupler body with the core body; the coupler-insert interface being configured to cooperate, in use, with a complementary interface defined on a further mold insert; the support-sliding interface and the complementary sliding interface being configured to cooperate, in use, to establish a slidable coupling that is able to accommodate, in use, a lateral move between the support-sliding interface and the complementary sliding interface and connect a load path between the support body with at least one of the core body with the coupler body.

SUMMARY

According to a first aspect claimed herein, there is provided a molding apparatus that includes a core ring that is configured to seat, in use, around a core insert in a mold stack. The core ring is configured to be received, at least in part, within a pocket that is defined within a split insert of the mold stack. The core ring is also configured to define at least a portion of a molding cavity having a core ring-to-split insert parting line that is within the pocket of the split insert.

According to a second aspect claimed herein, there is provided a molding apparatus, that includes a core insert of a mold stack that is configured to define an inner body portion of a molding cavity. The core insert is also configured to define a ring seat on a medial portion thereof upon which the core ring may be seated, in use, in cooperation with a mounting interface thereon. The core insert is further configured to define a core ring-to-core insert split line with the core ring that is within a pocket that is defined within a split insert of the mold stack.

According to a third aspect claimed herein, there is provided a mold stack that includes a core insert, a core ring, and a split insert that are configured to cooperate, in use, to define a molding cavity. The core insert defines a ring seat on a medial portion thereof upon which a core ring of the mold stack may be seated, in use, in cooperation with a mounting interface thereon. The split insert defines a pocket that extends coaxially through a bottom projecting portion thereof within which to receive a projecting portion of the core ring. The core ring and the split insert being further configured to define a core ring-to-split insert parting line that is within the pocket of the split insert.

These and other aspects and features will now become apparent to those skilled in the art upon review of the following description of specific non-limiting embodiments in conjunction with the accompanying drawings.

DETAILED DESCRIPTION OF THE DRAWINGS

The detailed description of illustrative (non-limiting) embodiments will be more fully appreciated when taken in conjunction with the accompanying drawings, in which:

FIG. 3A depicts a section view through the mold stack of FIG. 2;

FIG. 3B depicts an enlarged view of a portion of the mold stack that is shown in FIG. 3A;

FIG. 3C depicts a top view of an core ring of the mold stack shown in FIG. 2;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Figure 1:
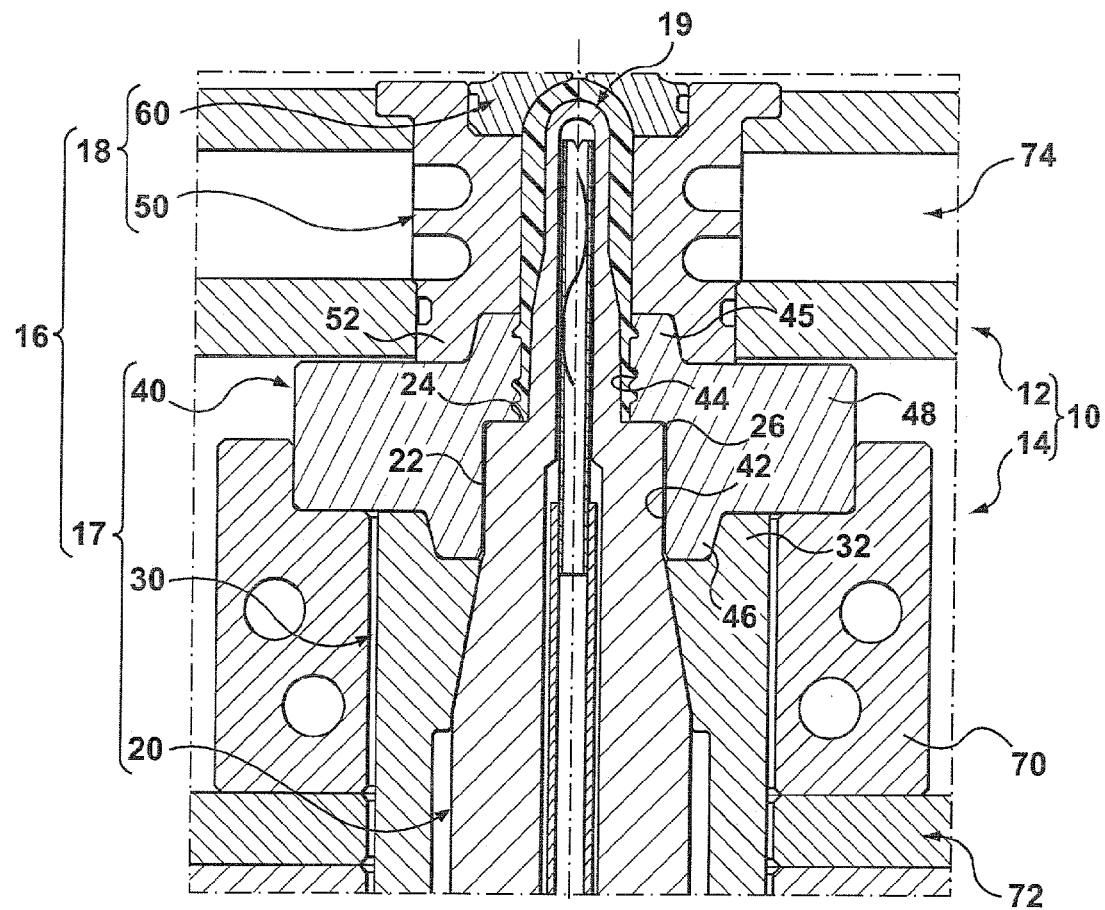
FIG. 1 depicts a section view through a known embodiment of a mold stack.
Figure 2:
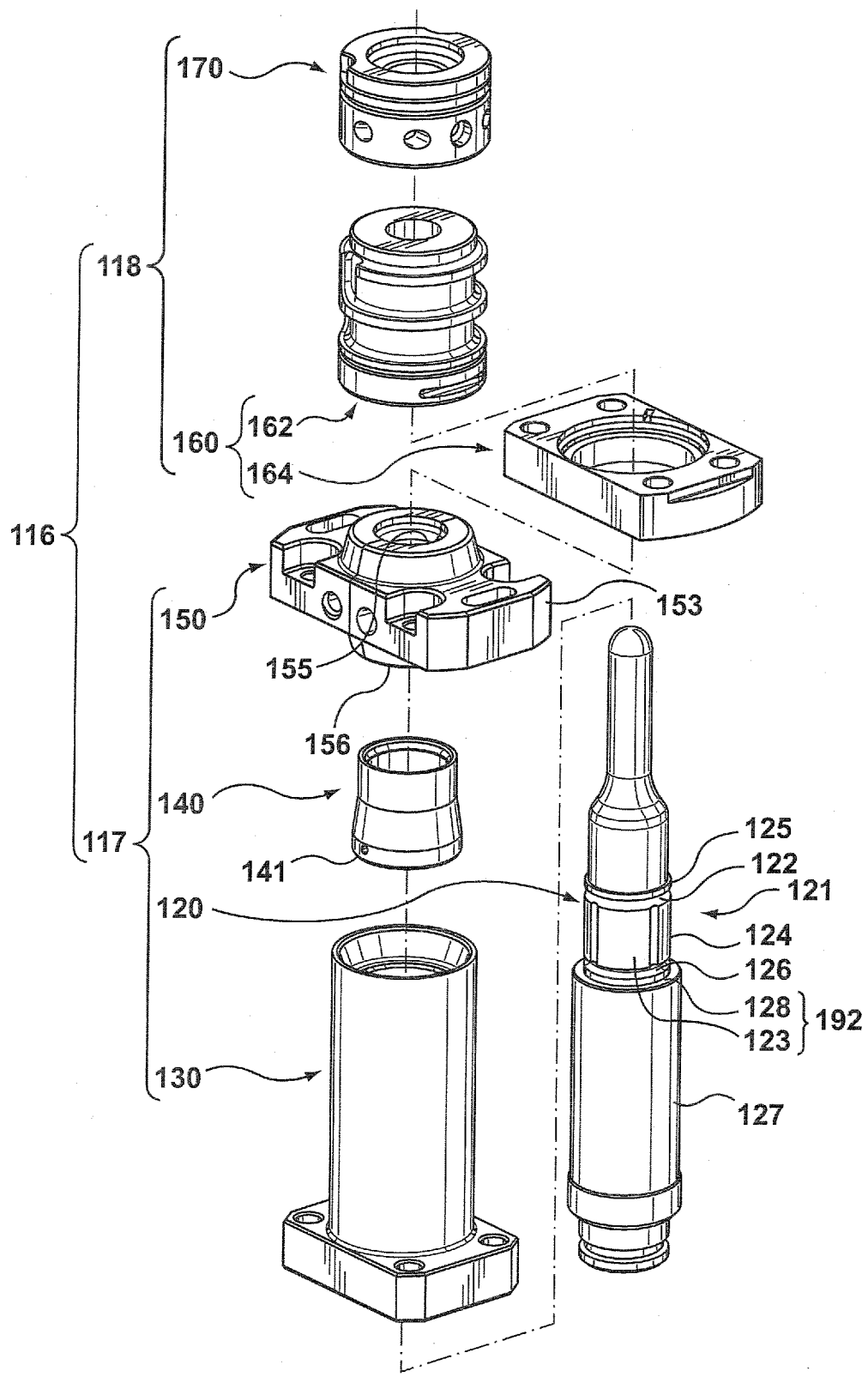
FIG. 2 depicts an exploded perspective view of a first non-limiting embodiment of a mold stack.

With reference to FIG. 2, there is depicted an exploded perspective view of a first non-limiting embodiment of a mold stack 116. The mold stack 116 includes a first stack portion 117 and second stack portion 118 that are associated, in use, with a first mold half (not shown) and a second mold half (not shown), respectively, of an injection mold (not shown).

The first stack portion 117 broadly includes a core insert 120, a lock ring 130, a core ring 140, and a split insert 150. The second stack portion 118 broadly includes a cavity insert 160 and a gate insert 170. The structure and operation of the foregoing is generally consistent with the prior art and hence a detailed description of the known features has been omitted herein.

With further reference to FIGS. 3A and 3B it may be appreciated that the core insert 120 defines an inner body portion 194 and part of a top portion 145 of a molding cavity 119. The structure of the core insert 120 generally includes a tubular body that is closed at one end. In operation, a coolant, such as water, may be circulated within the tubular body of the core insert 120 via a bubbler (not shown) that is arranged through the open end thereof. The tubular body defines a mounting interface, which has the form, as shown, of a cylindrical spigot with which to mount the core insert 120 to a first mold shoe (not shown) of the first mold half. The tubular body also defines a ring seat 192 on a medial portion thereof upon which the core ring 140 may be seated, in use, in cooperation with a mounting interface 190 thereon. More particularly, the ring seat 192 is located above a shoulder that is formed in the tubular body and includes an annular face 128 atop of the shoulder and an alignment part 123 of an outer medial surface 121 (FIG. 2) of the tubular body that is located above the shoulder.

The function of the lock ring 130, generally, is to align and hold closed members of the split insert 150 during a step of molding of a molded article. Another function of the lock ring 130 is to retain the core ring 140 in association with the core insert 120, as shown with reference to FIGS. 3A and 3B, and in so doing also retain the core insert 120 to the first mold shoe (not shown). The structure of the lock ring 130 generally includes a tubular body, within which a lower portion of the core insert 120 may be retained. The tubular body defines a mounting flange at its base for mounting to the first mold shoe (not shown). The tubular body also defines a first split insert seat 136 at an opposite end of the tubular body from the flange with which to cooperate, in use, with a first projecting portion 155 on the split insert 150 to perform the function of aligning and holding closed, in use, of the members thereof during the step of molding. The first split insert seat 136 has the form, as shown, of a conical female taper. In addition, the tubular body defines a retaining interface 132 on an inner surface thereof with which to cooperate, in use, with a retainer interface 143 on the core ring 140 to perform the function of trapping the core ring 140 on the core insert 120 and in turn retaining the core insert 120 to the first mold shoe (not shown). The retaining interface 132 has the form, as shown, of a conical female taper.

The split insert 150 defines an encapsulated portion 157 of the molding cavity 119, which may, for example, and as discussed previously, correspond to the neck region of a molded article such as a preform of the type for blow molding into a container for cooperating with a closure. The split insert 150, sometimes commonly known to those of skill in the art as neck rings or thread splits, may include, as shown, a pair of bodies that collectively define a flange portion 153 (FIG. 2) from which the first projecting portion 155 (i.e. top projecting portion) and a second projecting portion 156 (i.e. bottom projecting portion) extend from a top and a bottom face thereof. The function of the second projecting portion 156 in cooperation with a second split insert seat 166 that is associated with the cavity insert 160 is similar to that of the first projecting portion 155 in cooperation with the first split insert seat 136, as discussed previously, which is to align and hold closed the halves of the split insert 150 in relation thereto. The first projecting portion 155 and the second projecting portion 156 have the form, as shown, of conical male tapers. The pair of bodies also collectively define a pocket 152 that extends coaxially through the second projecting portion 156 within which to receive a projecting portion 149 of the core ring 140.

The core ring 140 defines a remaining part of the top portion 145 of the molding cavity 119 (FIG. 3A) (recalling that the top portion 145 is also partially defined on the core insert 120). That is, the top portion 145 of the molding cavity 119 is split between the core ring 140 and the core insert 120. A technical effect of defining part of the top portion 145 of the molding cavity 119 with the core ring 140 may include ease and efficiency of manufacture relative to defining it entirely on the core insert 120. In terms of structure, the core ring 140 includes a ring body that defines the remaining part of the top portion 145 of the molding cavity through a top face 148 thereof adjacent to an inner surface 144 thereof.

The core ring 140 is further configured to define a core ring-to-split insert parting line 180 that is within the pocket 152 of the split insert 150. More particularly, the top face 148 of the projecting portion 149 defines the core ring-to-split insert parting line 180 in cooperation with a recessed face 158 of the pocket 152 in the split insert 150. In addition, the core ring 140 forms a core ring-to-core insert split line 182 with the core insert 120. More particularly, the inner surface 144 of the core ring 140 defines the core ring-to-core insert split line 182 in cooperation with an outer medial surface 121 (FIG. 2) of the core insert 120.

The core ring 140 also defines a split line vent 110 in cooperation with the core insert 120 along the core ring-to-core insert split line 182 for venting, in use, air from the top portion 145 of the molding cavity 119. A technical effect of the split line vent 110 may include avoidance of defects in the molded article that result from trapped air. To further support the venting, the core ring 140 includes a branch conduit 141 with which to fluidly connect the split line vent 110 with a trunk pressure conduit 112 that is defined between the core insert 120, the core ring 140 and the lock ring 130. As such the ring body of the core insert 140 defines the branch conduit 141 as a channel that extends through a lower part of a sidewall thereof.

In view of the foregoing it may now be further appreciated that the tubular body of the core insert 120 also defines a network of interconnected grooves, as best shown in FIGS. 2 and 3B, along the outer medial surface 121 thereof, to assist in defining the split line vent 110. These interconnected grooves include an upper collector groove 122, a lower collector groove 126, and a plurality of vertical grooves 124 that extend therebetween. The upper collector groove 122 is positioned on the tubular body to be near to the molding cavity for collecting, in use, air that passes between the narrowly gaped cylindrical faces that are defined on an upper part 125 of the upper medial surface 121 of the tubular body and the inner surface 144 of the ring body on the core ring 140. The lower collector groove 126 is positioned on the tubular body to be adjacent to the branch conduit 141 on the core ring 140 for channeling, in use, air thereto. The plurality of vertical grooves 124 fluidly connect, in use, the upper and lower collector grooves 122, 126.

Likewise, it may also now be further appreciated that the trunk pressure channel 112 is provided in a gap that is defined between an inner cylindrical surface 131 of the tubular body on the lock ring 130, and the outer cylindrical surfaces 127, 199 of the tubular body and the ring body of the core insert 120 and the core ring 140, respectively. Lastly, the tubular body of the lock ring 130 may also define a connecting pressure conduit 114 (FIG. 3A) with which to connect, in use, the trunk pressure conduit 112 to a controllable source of air (i.e. source or sink of air pressure). A technical effect of the foregoing may include the ability to purge molding residue from the split line vent 110, particularly from the narrow gap in an upper portion thereof that is located adjacent to the molding cavity 119.

Furthermore, it may now be further appreciated that the core ring 140 and the split insert 150 cooperate to define a parting line vent 115 across the core ring-to-split insert parting line 180 with which to provide, in use, additional venting of the air from the molding cavity 119 during the step of molding. In particular, and with reference to FIG. 3C, it may be appreciated that the top face 148 of the core ring 140 includes a plurality of semi-annular pads 147 that are separated by a plurality of vent slots 146. Thus, during the step of molding, the plurality of semi-annular pads 147 form a shut-off in contact with the recessed face 158 of the pocket 152 in the split insert 150, whereas the plurality of vent slots 146 are configured to form the parting line vent 115 in cooperation with the recessed face 158. Furthermore, the core ring 140 and the split insert 150 also cooperate to define a parting line vent conduit 113 with which to fluidly connect the parting line vent 115 with a split insert vent 159 that is defined between members of the split insert 150. In particular, the parting line vent conduit 113 is defined in a gap between the projecting portion 149 of the core ring 140 that is locatable, in use, within the pocket 152 of the split insert 150.

To complete the description of the core ring 140, and recalling that the core ring 140 also includes a mounting interface 190 with which to mount the core ring 140 around a core insert 120 in cooperation with a ring seat 192 thereon, it may now be appreciated that the ring body defines the mounting interface 190 along an aligning part 142 of the inner surface 144 thereof.

In addition, recalling that the core ring 140 also includes a retainer interface 143 with which to trap the core ring 140 on the core insert 120 in cooperation with a retaining interface 132 on the lock ring 130, it may now be appreciated that the ring body defines the retainer interface 143 on an alignment part of an outer surface thereof. The retainer interface 143 has the form, as shown, of a conical male taper.

Turning now to a brief description of the remaining members of the mold stack 116, and with reference to FIGS. 2 and 3A, it may be appreciated that the cavity insert 160, may include, as shown, a cavity insert part 162 for installation, in use, into a bore (not shown) that is defined in a second mold shoe (not shown) of the second mold half. The cavity insert part 162 defines an outer body portion 168 of the molding cavity 119. The cavity insert 160 also includes a mounting flange 164 that mounts, in use, to the second mold shoe, the cavity insert part 162 being structured to retain the cavity insert part 162 in the bore. The cavity insert part 162 also defines the second split insert seat 166.

Lastly, the gate insert 170 defines an end portion 172 of the molding cavity 119. The structure of the gate insert 170 generally includes a cylindrical body that defines the end portion 172 and a nozzle interface 173 through opposing ends thereof, the two being connected by a gate conduit. The nozzle interface 173 cooperates, in use, with a nozzle (not shown) of a melt distribution apparatus (not shown), such as a hot runner, for introducing melt into the molding cavity 119. The gate insert 170 mounts, in use, within the bore of the second mold shoe (not shown) with the cavity insert 160.

Figure 4:
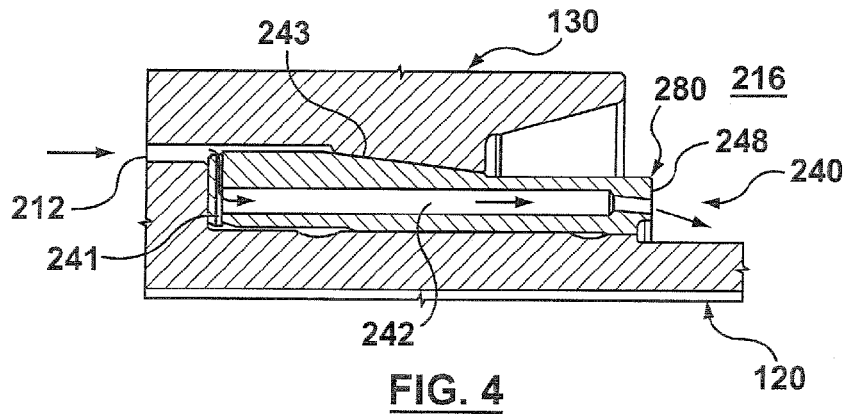
FIG. 4 depicts a section view of a portion of a mold stack in accordance with a second non-limiting embodiment.

With reference to FIG. 4, there is depicted a section view through a portion of a second non-limiting embodiment of a mold stack 216. The second non-limiting embodiment of the mold stack 216 is the same as the first embodiment of the mold stack 116 with the exception that it includes a different core ring 240. The core ring 240 is similar to the core ring 140, of the first non-limiting embodiment of the mold stack 116, except that it further includes an air nozzle 242 with which to provide air assisted ejection, in use, of the molded article from the core insert 120. The air nozzle 242 is defined in the ring body of the core ring 240. The air nozzle 242 includes an inlet aperture that fluidly connects to a branch conduit 241 that is defined through the sidewall of the ring body. As such, the branch conduit 241 fluidly connects a trunk pressure conduit 212 (like the trunk pressure conduit 112 described previously) with the air nozzle 242. The air nozzle 242 also includes an outlet aperture on the top face 248 of the core ring 140 through which to dispense high velocity air in the direction of a molded article (not shown) on the core insert 220.

Figure 5:
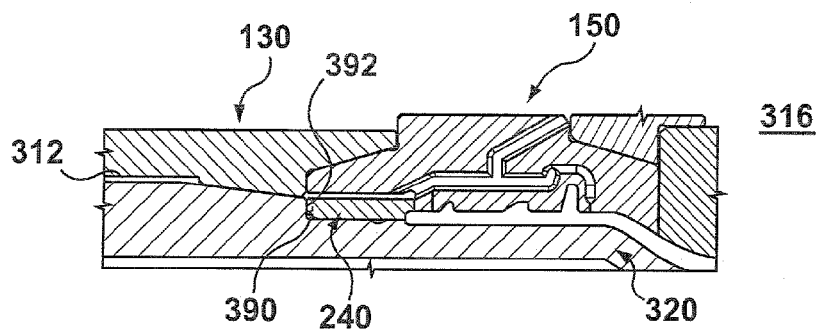
FIG. 5 depicts a section view of a portion of a mold stack in accordance with a third non-limiting embodiment

With reference to FIG. 5, there is depicted a section view through a portion of third non-limiting embodiment of a mold stack 316. The third non-limiting embodiment of the mold stack 316 is similar to the first embodiment of the mold stack 116 with the exception that it includes a core ring 340 that is pressed fit onto a core insert 320 for retention thereon without the assistance of the lock ring 130. As such, a ring body of the core ring tubular body of the core insert 320 defines a cylindrical mounting interface 390 that forms an interference fit with an annular ring seat 392 that is defined on the core insert 320.

Figure 6:
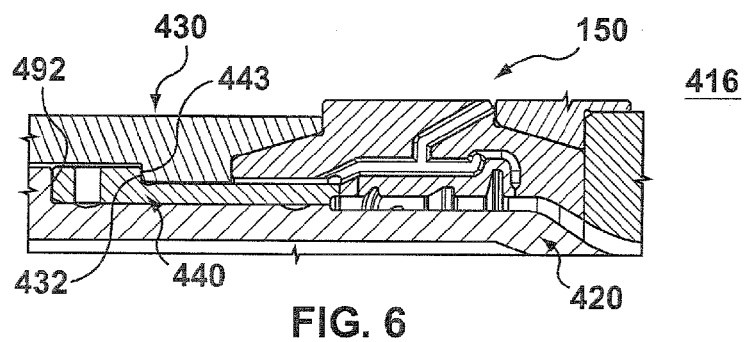
FIG. 6 depicts a section view of a portion of a mold stack in accordance with a fourth non-limiting embodiment.

With reference to FIG. 6, there is depicted a section view through a portion of fourth non-limiting embodiment of a mold stack 416. The fourth non-limiting embodiment of the mold stack 416 is similar to the third embodiment of the mold stack 316 with the exception that the lock ring 430 further cooperates to retain the core ring 440 on a core insert 420. As such, a tubular body of the lock ring 430 defines a retaining interface 432 on an inner surface thereof with which to cooperate, in use, with a retainer interface 443 on the core ring 440 to perform the function of trapping the core ring 440 on the core insert 420. The tubular body and the ring body of the lock ring 430 and the core ring 440, respectively, define the retaining interface 432 and the retainer interface 443 across close fitting diametrical steps thereon.

Figure 7:
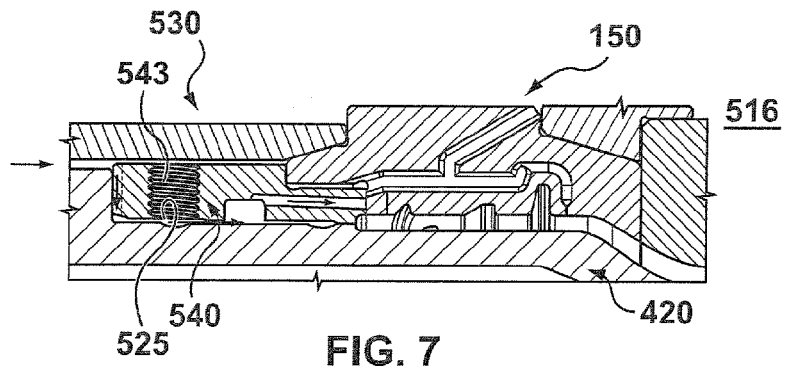
FIG. 7 depicts a section view of a portion of a mold stack in accordance with a fifth non-limiting embodiment.

With reference to FIG. 7, there is depicted a section view through a portion of fifth non-limiting embodiment of a mold stack 516. The fifth non-limiting embodiment of the mold stack 516 is similar to the third embodiment of the mold stack 316 with the exception that a core ring 540 thereon is further configured to cooperate with a fastener (not shown) to retain it to a core insert 520. In particular, a ring body of the core ring 540 defines a retainer interface 543 that is configured to threadably receive the fastener (not shown) therein, and wherein a tubular body of the core insert 520 defines a retaining interface 525, in the form of a groove, for receiving an end of the fastener.

Figure 8:
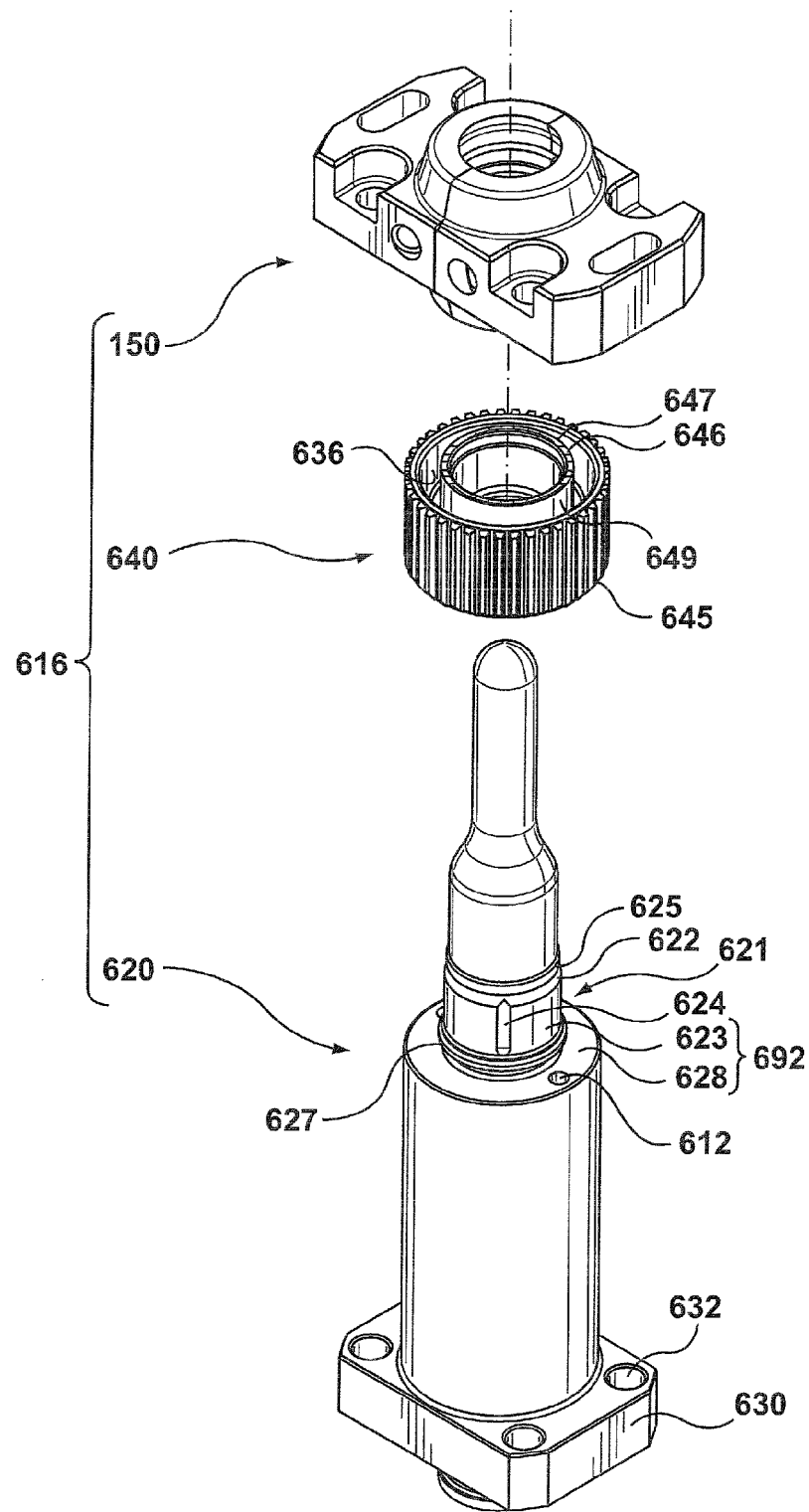
FIG. 8 depicts an exploded perspective view of a sixth non-limiting embodiment of a mold stack.
Figure 9:
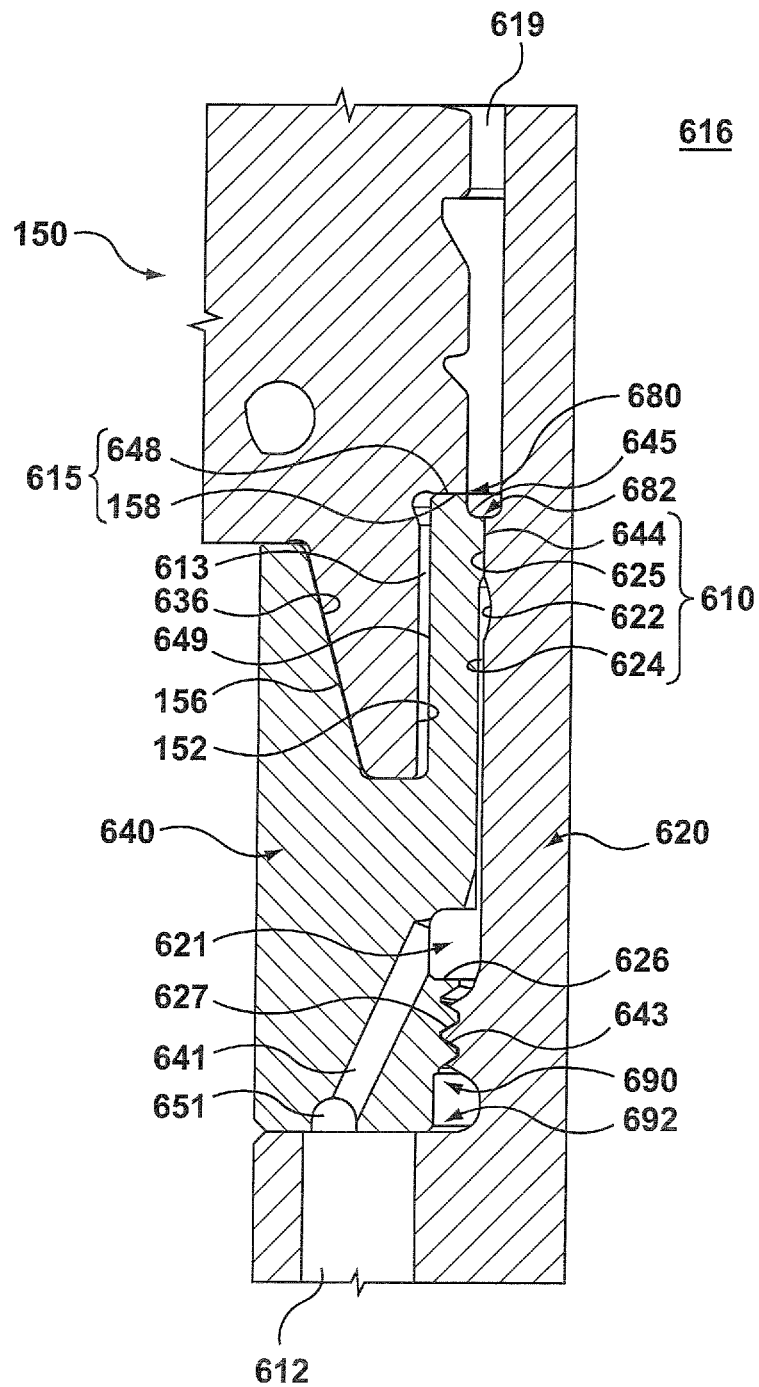
FIG. 9 depicts a section view through a portion of the mold stack of FIG. 8.

With reference to FIGS. 8 and 9, there is depicted a sixth non-limiting embodiment of a mold stack 616. The sixth non-limiting embodiment of the mold stack 616 is similar to the first embodiment of the mold stack 116.

Like the core ring 140 (FIG. 2), the mold stack 616 includes a core ring 640 that is arranged, in use, around a medial portion 621 of a core insert 620. More particularly, the core insert 620 has a tubular body that defines a ring seat 692 on the outer medial surface 621 thereof upon which the core ring 640 may be seated, in use, in cooperation with a mounting interface 690 thereon. The top portion 645 of the molding cavity 619 is split between the core ring 640 and the core insert 620, wherein a core ring-to-core insert split line 682 is defined between the two.

The core ring 640 is configured to be received, at least in part, within the pocket 152 that is defined within the split insert 150. More specifically, the core ring 640 has a ring body that includes a projecting portion 649 that is receivable within the pocket 152 of the split insert 150, wherein a top face 648 of the projecting portion 649 defines a core ring-to-split insert parting line 680 in cooperation with a recessed face 158 of the pocket 152.

The core ring 640 and the split insert 150 also cooperate to define a parting line vent 615 across the core ring-to-split insert parting line 680 with which to provide, in use, venting of the air from the molding cavity 619 during the step of molding. In particular, as best shown in FIG. 8, it may be appreciated that the top face 648 of the core ring 640 includes a plurality of semi-annular pads 647 that are separated by a plurality of vent slots 646. Thus, during the step of molding, the plurality of semi-annular pads 647 form a shut-off in contact with the recessed face 158 of the pocket 152 in the split insert 150, whereas the plurality of vent slots 646 are configured to form the parting line vent 615 in cooperation with the recessed face 158. Furthermore, the core ring 140 and the split insert 150 also cooperate to define a parting line vent conduit 613 with which to fluidly connect the parting line vent 615 with a split insert vent (not shown) that is defined between members of the split insert 150. In particular, the parting line vent conduit 613 is defined in a gap between the projecting portion 649 of the core ring 640 that is locatable, in use, within the pocket 152 of the split insert 150.

That being said, there are several notable differences between the mold stack 616 and the mold stack 116. Chief among these is that the mold stack 116 does not require a lock ring 130. Instead, the functions of the lock ring 130 have been incorporated into the core insert 620 and the core ring 640 of the mold stack 616. More particularly, the core insert 620 has been structured to be directly retained to a core plate (not shown) of the first mold half (not shown) by means of a retaining flange 630 that is provided at an end thereof. The retaining flange 630 includes a set of bores defined therethrough for receiving, in use, fasteners (not shown) for fastening the core insert 620 to the core plate. In addition, the core ring 640 has been structured to align and hold closed the split insert 150 (i.e. keep the halves thereof in a closed configuration) during a step of molding of the molded article (not shown). More specifically, the core ring 640 has been structured to define a first split insert seat 636. The first split insert seat 636 has the form, as shown, of a conical female taper for receiving the second projecting portion 156 (i.e. male taper) of the split insert 150.

Another notable difference between the mold stack 616 and the mold stack 116 is that the core ring 640 is fastened to the core insert 620 instead of being retained in relation thereto by the lock ring 130 (FIG. 3B). As such, the core ring 640 defines a retainer interface 643 that is configured to cooperate, in use, with a retaining interface 627 on the core insert 620 to retain the core ring 640 to the core insert 620. More particularly, the core ring 640 and the core insert 620 are structured to be threadably connected together. Specifically, the retaining interface 627 on the core insert 620 is a core thread 627 that is provided adjacent to a bottom of an outer medial surface 121 thereof. The retainer interface 643 on the core ring 640 is a ring thread 643 near a bottom of an inner surface 644 thereof. The ring thread and the core thread are adapted to cooperate to releasably engage with relative rotation between the core ring 640 and the core insert 620. To facilitate such relative rotation, the core ring 640 may be structured to include tooling splines 645 covering an outer surface thereof, wherein the tooling splines 645 are engageable with a complementary spline tool (not shown). A technical effect of threadably fastening the core ring 640 to the core insert 620 may include increased ease with which the core ring 640 may be replaced. As a further benefit, the core ring 640 may conceivably be replaced with the injection mold arranged in the molding machine (not shown).

A further notable difference between the mold stack 616 and the mold stack 116 is the specific structure of the split line vent 110 that is provided along the core ring-to-core insert split line 682 and the manner in which it is connected to a source or sink of air pressure. More particularly, the tubular body of the core insert 620 defines a network of interconnected grooves, as best shown in FIG. 8, along the outer medial surface 621 thereof, to assist in defining the split line vent 610. Like the outer medial surface 121 (FIG. 2) the outer medial surface 621 has interconnected grooves that include an upper collector groove 622 and a plurality of vertical grooves 624 that extend downwardly therefrom. As best shown with reference to FIG. 9, the upper collector groove 622 is positioned on the tubular body near to the molding cavity for collecting, in use, air that passes between the narrowly gaped cylindrical faces that are defined on an upper part 625 of the upper medial surface 621 of the tubular body and the inner surface 644 of the ring body on the core ring 640. The plurality of vertical grooves 624 fluidly connect, in use, the upper collector groove 622 with a lower collector groove 626 that is defined in the core ring 640, recalling that previously the lower collector groove 126 had been provided on the core insert 120 (FIGS. 2 and 3B), for channeling, in use, air therebetween. Like the core ring 140 (FIG. 3B), the core ring 640 includes a branch conduit 641 with which to fluidly connect the split line vent 610 with a trunk pressure conduit 612. The notable difference being that the trunk pressure conduit 612 is defined in the core insert 620 in absence of the lock ring 120. To ensure fluid communication between the pressure conduit 612 and the branch conduit 641, a coupling groove 651 is provided therebetween, the coupling groove 651 extending around a base of the core ring 640.

Figure 10:
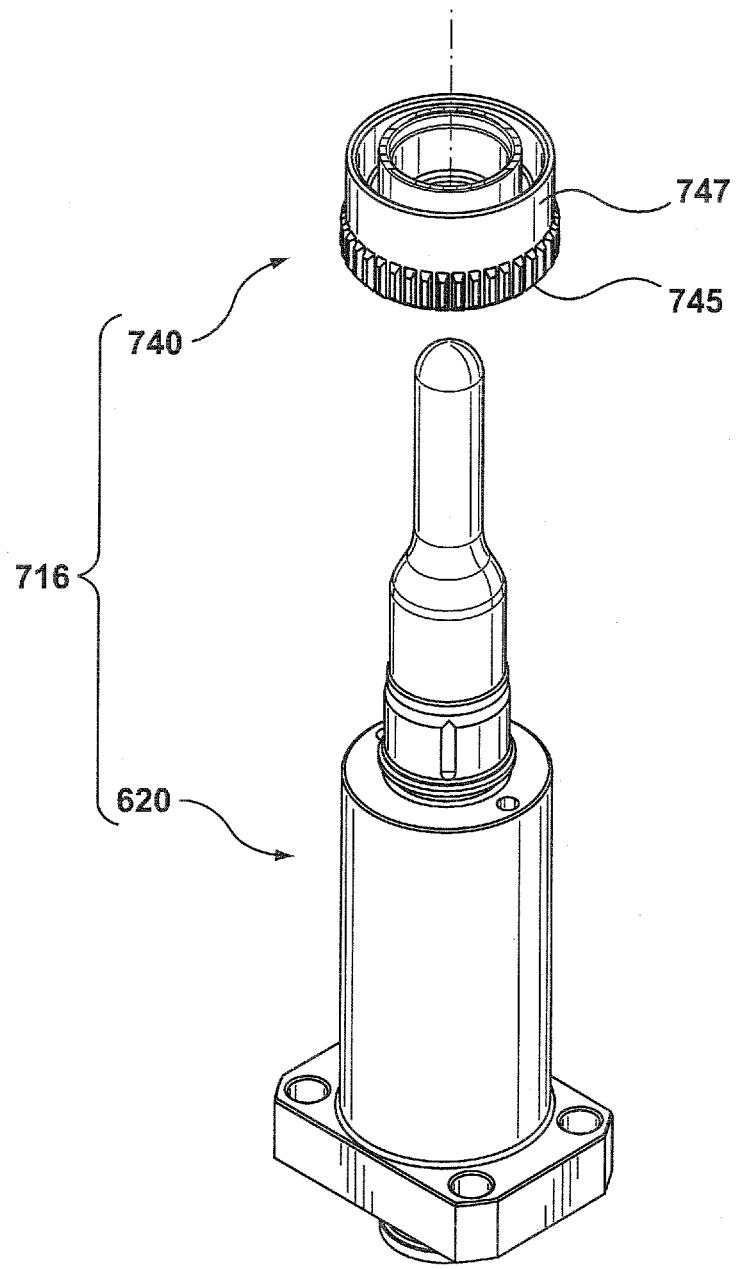
FIG. 10 depicts an exploded perspective view of a seventh non-limiting embodiment of a mold stack.

With reference to FIG. 10, there is depicted a section view through a portion of seventh non-limiting embodiment of a mold stack 716. The seventh non-limiting embodiment of the mold stack 716 is identical to the sixth embodiment of the mold stack 616 with the sole exception that a core ring 740 thereof has tooling splines 745 that cover only a lower portion of an outer surface thereof. In this way, an upper portion 747 of the outer surface of the core ring 740 may be structured to be relatively narrow, which alleviates a space requirement for the core ring 740 within the slide pair (not shown) of the stripper assembly (not shown) which in turn makes the construction of the slide pair more robust.

It is noted that the foregoing has outlined some of the more pertinent non-limiting embodiments. These non-limiting embodiments may be used for many applications. Thus, although the description is made for particular arrangements and methods, the intent and concept of these non-limiting embodiments may be suitable and applicable to other arrangements and applications. It will be clear to those skilled in the art that modifications to the disclosed non-limiting embodiments can be effected. The described non-limiting embodiments ought to be construed to be merely illustrative of some of the more prominent features and applications thereof. Other beneficial results can be realized by applying these non-limiting embodiments in a different manner or modifying them in ways known to those familiar with the art. This includes the mixing and matching of features, elements and/or functions between various non-limiting embodiments is expressly contemplated herein, unless described otherwise, above.

What is claimed is:

1. A mold stack, comprising:
a core insert, a core find, and a split insert that are configured to cooperate, in use, to define a molding cavity; the core insert defines a ring seat on a medial portion thereof upon which the core ring may be seated, in use, in cooperation with a mounting interface thereon;
the split insert defines a pocket that extends coaxially through a bottom projecting portion thereof within which to receive a projecting portion of the core ring;
the core ring and the split insert being further configured to define a core ring-to-split insert parting line that is within the pocket of the split insert; and
a lock ring to retain the core insert;
a top portion of the molding cavity is split between the core ring and the core insert; an inner surface of the core ring defines a core ring-to-core insert split line in cooperation with an outer medial surface of the core insert;

the core ring defines a split line vent that is configured to cooperate, in use, with the core insert along the core ring-to-core insert split line for venting, in use, air from the molding cavity;

wherein, the core ring defines a branch conduit that is configured to fluidly connect the split line vent with a trunk pressure conduit that is defined between the core insert, the core ring, and the lock ring of the mold stack.

2. The mold stack of claim 1, wherein:

a top face of the core ring defines the core ring-to-split insert parting line in cooperation with a recessed face of the pocket in the split insert.

3. The mold stack of claim 2 wherein:

the core ring defines an air nozzle therein that has an outlet aperture on the top face of the core ring for providing, in use, air assisted ejection of a molded article from the core insert.

4. The mold stack of claim 2, wherein:

the core ring defines a parting line vent in cooperation with the split insert across the core ring-to-split insert parting line for venting, in use, air from the molding cavity.

5. The mold stack of claim 4, wherein:

the top face of the core ring includes a plurality of semi-annular pads that are separated by a plurality of vent slots, wherein the plurality of semi-annular pads are configured to provide a shut-off, in use, in contact with the recessed face of the pocket in the split insert, and further wherein the plurality of vent slots are configured to form the parting line vent, in use, in contact with the recessed face of the pocket in the split insert.

6. The mold stack of claim 1, wherein:

the core ring defines a retainer interface that is configured to cooperate, in use, with a retaining interface on the core insert to retain the core ring to the core insert.

7. The mold stack of claim 6, wherein:

the retaining interface on the core insert is a core thread and the retainer interface is a ring thread, wherein the ring thread and the core thread are adapted to cooperate to releasably engage with relative rotation between the core ring and the core insert.

8. The mold stack of claim 1, wherein:

the core ring defines a retainer interface that is configured to cooperate, in use, with a retaining interface on the lock ring of the mold stack to retain the core ring to the core insert.

9. The mold stack of claim 1, wherein:

the core ring has been structured to define a first split insert seat for receiving a second projecting portion of the split insert.

10. The mold stack of claim 9 wherein:

the first split insert seat has a form, as shown, of a conical female taper.

* * * * *